United States Patent
Fukuda

(10) Patent No.: US 6,525,120 B2
(45) Date of Patent: Feb. 25, 2003

(54) POLYMER COMPOSITION

(75) Inventor: Kanako Fukuda, Sakai (JP)

(73) Assignee: Sumitomo Chemical Co., Ltd., Osaka (JP)

(*) Notice: Subject to any disclaimer, the term of this patent is extended or adjusted under 35 U.S.C. 154(b) by 0 days.

(21) Appl. No.: 09/865,731

(22) Filed: May 29, 2001

(65) Prior Publication Data

US 2002/0002249 A1 Jan. 3, 2002

(30) Foreign Application Priority Data

May 29, 2000 (JP) .................................. 2000-157814

(51) Int. Cl.⁷ .............................................. C08K 5/134
(52) U.S. Cl. .................... 524/293; 528/193; 528/206
(58) Field of Search ................... 524/293; 528/193, 528/206

(56) References Cited

U.S. PATENT DOCUMENTS 4,525,514 A * 6/1985 Yachigo et al.

FOREIGN PATENT DOCUMENTS

JP 61027943 A 2/1986

OTHER PUBLICATIONS

Yachigo et al., 'Studies on Polymer Stablisers: Part I –A Novel Thermal Stabiliser for Butadiene Polymers', Polymer Degradation and Stability 22 (1988) pp. 63–77.

* cited by examiner

Primary Examiner—James J. Seidleck
Assistant Examiner—Olga Asinovsky
(74) Attorney, Agent, or Firm—Fitch, Even, Tabin & Flannery

(57) ABSTRACT

A polymer composition having satisfactory processing stability is provided which comprises
a polymer;
a bisphenol monoester represented by the Formula (1):

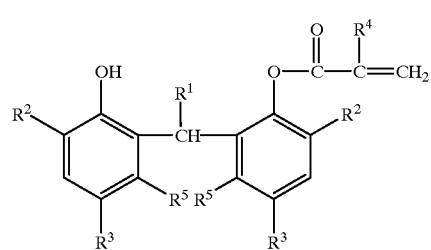

(1)

wherein $R^1$ represents hydrogen, alkyl or phenyl group; $R^2$ and $R^3$ each independently represents alkyl group; and $R^4$ and $R^5$ each independently represents hydrogen or methyl group; and a bisphenol diester represented by Formula (2)

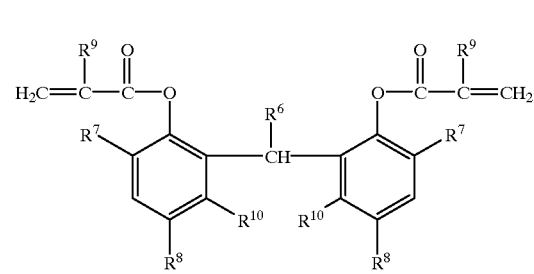

(2)

wherein $R^6$ represents hydrogen, alkyl or phenyl group; $R^7$ and $R^8$ each independently represents alkyl group; and $R^9$ and $R^{10}$ each independently represents hydrogen or methyl group in which amount of the compound of formula (2) is 0.001 to 5 parts by weight based on 100 parts by weight of the total amount of the compounds of formulae (1) and (2).

9 Claims, No Drawings

POLYMER COMPOSITION

BACKGROUND OF THE INVENTION

The present invention relates to a polymer composition with improved processing stability, which does not easily cause cross-linking even when heated.

Polymers having monomer units derived from dienes, such as styrene-butadiene block copolymers, have the drawbacks that they easily cause cross-linking by heat during the processing, such as injection molding, extruding and kneading etc. As the result, polymers lose their flowability during their processing since they contain carbon-carbon double bonds (C=C) within their polymer chains. The decrease of flowability often causes troubles during the processing. For example, in the styrene-butadiene block copolymers, it may cause decrease in their elasticity, viscosity, impact resistance, etc.

A polymer composition in which a bisphenol monoester represented by the Formula (1):

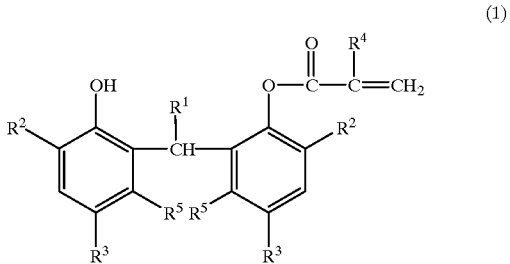

wherein $R^1$ represents hydrogen, alkyl having one to five carbon atoms or phenyl group; $R^2$ and $R^3$ each independently represents alkyl group having one to nine carbon atoms; and $R^4$ and $R^5$ each independently represents hydrogen or methyl group (hereinafter abbreviated as "Compound (1)") is comprised to supress lowering of such processing stability is known as disclosed in U.S. Pat. No. 4,525,514, etc. Such a polymer composition, which cross-linking of the polymer is suppressed, has a satisfactory processing stability, and causes less formation trouble during processing.

However, polymer compositions with more improved processing stability has been demanded.

The present inventors have extensively studied to develop a polymer composition with more improved processing stability. As a result, they have found that incorporation of Compound (1) and a specific bisphenol diester into a polymer effectively prevent cross-linking of the polymer during heating and also improve the processing stability. Thus, this invention was completed.

SUMMARY OF THE INVENTION

The present invention provides a polymer composition comprising a polymer; Compound (1); and a bisphenol diester represented by Formula (2)

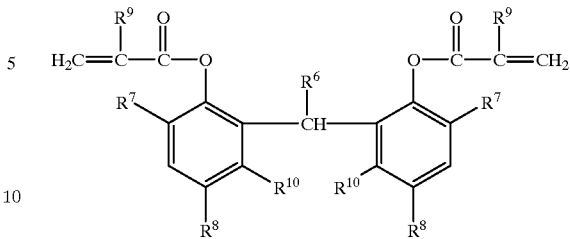

wherein $R^6$ represents hydrogen, alkyl having one to five carbon atoms or phenyl group; $R^7$ and $R^8$ each independently represents alkyl group having one to nine carbon atoms; and $R^9$ and $R^{10}$ each independently represents hydrogen or methyl group (hereinafter abbreviated as "Compound (2)") in which amount of the Compound (2) is 0.001 to 5 parts by weight based on 100 parts by weight of the total amount of the Compounds (1) and (2).

EMBODIMENTS OF THE INVENTION

The polymer as a constituent of the polymer composition of the present invention includes, for example, those having carbon-carbon double bonds (C=C) within their polymer chains. As such polymers, for example, those having a diene unit as one of its polymerization units, such as a unit derived from butadiene, can be mentioned. Examples of such polymers include butadiene polymers such as styrene-butadiene block copolymers (SBS), butadiene rubbers (BR), styrene/butadiene rubbers (SBR), and high-impact polystyrenes (HI-PS). These polymers can be produced by conventional polymerization methods such as emulsion-polymerization, solution-polymerization, bulk-polymerization, and suspension-polymerization methods.

In Formula (1), $R^1$ represents hydrogen, alkyl having one to five carbon atoms or phenyl group. Among these groups, hydrogen and alkyl group having one to five carbon atoms are preferred as $R^1$, and hydrogen and methyl group are more preferred.

$R^2$ represents alkyl group having one to nine carbon atoms. Preferably, it represents alkyl group having four to eight carbon atoms, and more preferably it represents a group represented by Formula (3):

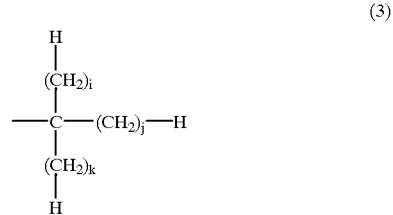

wherein i, j and k each independently represents an integer of one to five, and I+j+k is three to seven, such as t-butyl, t-amyl, t-octyl groups, etc.

$R^3$ in Formula (1) represents alkyl group having one to nine carbon atoms, preferably, alkyl group having one to six carbon atoms, and more preferably methyl, ethyl, t-butyl and t-amyl group. $R^2$ and $R^3$ in Formula (1) may be identical or different.

$R^4$ and $R^5$ in Formula (1) each independently represents hydrogen or methyl group, and they may be identical or different.

Examples of Compound (1) include 2-t-butyl-6-(3-t-butyl-2-hydroxy-5-methylbenzyl)-4-methylphenyl acrylate,
2-t-butyl-6-(3-t-butyl-2-hydroxy-5-ethylbenzyl)-4-ethylphenyl acrylate,
2,4-di-t-butyl-6-(3,5-di-t-butyl-2-hydroxy-benzyl)phenyl acrylate,
2-t-butyl-6-[1-(3-t-butyl-2-hydroxy-5-methylphenyl)ethyl]-4-methylphenyl acrylate,
2-t-butyl-6-[1-(3-t-butyl-2-hydroxy-5-ethylphenyl)ethyl]-4-ethylphenyl acrylate,
2,4-di-t-butyl-6-[1-(3,5-di-t-butyl-2-hydroxyphenyl)ethyl] phenyl acrylate,
2,4-di-t-amyl-6-[i-(3,5-di-t-amyl-2-hydroxyphenyl)ethyl] phenyl acrylate,
2-t-butyl-6-(3-t-butyl-2-hydroxy-5-methylbenzyl)-4-methylphenyl methacrylate,
2-t-butyl-b-[1-(3-t-butyl-2-hydroxy-5-methylphenyl)ethyl]-4-methylphenyl methacrylate,
2,4-di-t-butyl-6-(3,5-di-t-butyl-2-hydroxy-benzyl)phenyl methacrylate,
2-t-butyl-6-[1-(3-t-butyl-2-hydroxy-5-ethylphenyl)ethyl]-4-ethylphenyl methacrylate,
2-t-butyl-6-(3-t-butyl-2-hydroxy-5-ethylbenzyl)-4-ethylphenyl methacrylate,
2,4-di-t-butyl-6-[1-(3,5-di-t-butyl-2-hydroxyphenyl)ethyl] phenyl methacrylate,
2,4-di-t-amyl-6-[1-(3,5-di-t-amyl-2-hydroxyphanyl)ethyl] phenyl methacrylate, etc.

Compound (1) can be used alone or as a mixture of two or more. Compound (1) can be produced by conventional methods such as those disclosed in JP-A-59-144,733, JP-A-63-5,053, and JP-A-4-264,051, and U.S. Pat. No. 3,984,372.

Compound (2) is the compound represented by Formula (2). $R^6$ in Formula (2) represents hydrogen, alkyl having one to five carbon atoms or phenyl group; preferably hydrogen or alkyl group having one to five carbon atoms; and more preferably hydrogen or methyl group.

$R^7$ in Formula (2) represents alkyl group having one to nine carbon atoms, preferably, alkyl group having four to eight carbon atoms, and more preferably a group represented by Formula (3) such as t-butyl, t-amyl, and t-octyl groups. $R^8$ in Formula (2) represents alkyl group having one to nine carbon atoms, preferably, alkyl group having one to six carbon atoms, and more preferably methyl, ethyl, t-butyl, and t-amyl groups. $R^7$ and $R^8$ may be identical or different.

$R^9$ and $R^{10}$ in Formula (2) each independently represent hydrogen or methyl group, and they may be identical or different.

Examples of Compound (2) include 2,2'-methylenebis(6-t-butyl-4-methylphenyl)diacrylate,
2,2'-methylenebis(6-t-butyl-4-ethylphenyl)diacrylate,
2,2'-methylenebis(4,6-di-t-butylphenyl)diacrylate,
2,2'-ethyridenebis(6-t-butyl-4-methylphenyl)diacrylate,
2,2'-ethyridenebis(6-t-butyl-4-ethylphenyl)diacrylate,
2,2'-ethyridenebis(4,6-di-t-butylphenyl)diacrylate,
2,2'-ethyridenebis(4,6-di-t-amylphenyl)diacrylate,
2,2'-methylenebis(6-t-butyl-4-methylphenyl) dimethacrylate,
2,2,2'-methylenebis(4,6-di-t-butylphenyl)dimethacrylate,
2,2'-methylenebis(6-t-butyl-4-ethylphenyl)dimethacrylate,
2,2'-ethyridenebis(6-t-butyl-4-methylphenyl) dimethacrylate,
2,2'-ethyridenebis(6-t-butyl-4-ethylphenyl)dimethacrylate,
2,2'-ethyridenebis(4,6-di-t-butylphenyl)dimethacrylate,
2,2'-ethyridenebis(4,6-di-t-amylphenyl)dimethacrylate, etc.

Compound (2) can be used alone or as a mixture of two or more. Compound (2) can be produced by a conventional method, such as a method disclosed in JP-A-61-27,943.

$R^1$ in Formula (1) and $R^6$ in Formula (2) may be identical or different. $R^2$ and $R^7$ may be identical or different. $R^3$ and $R^8$ may be identical or different. $R^4$ and $R^9$ may be identical or different. $R^5$ and $R^{10}$ may be identical or different.

In the polymer composition of the present invention, the amount of Compound (2) is at least 0.001 part by weight but not more than about five parts by weight based on 100 parts by weight of the total amount of Compounds (1) and (2). When the amount of Compound (2) exceeds five parts by weight, the resulting polymer composition tends to lower in its processing stability. Preferably, the amount of Compound (2) is not more than about 2.5 parts by weight based on 100 parts by weight of the total amount of Compounds (1) and (2).

When the amount of Compound (2) is less than 0.001 part by weight, the improvement of the processing stability attained by the use of Compound (2) tends to become insufficient. Preferably, the amount of Compound (2) is not less than about 0.008 part by weight, more preferably not less than about 0.15 part by weight, based on 100 parts by weight of the total amount of Compounds (1) and (2).

The total amount of Compounds (1) and (2) in the polymer composition of the present invention is usually about 0.01-2 parts by weight, preferably about 0.05-1 part by weight based on 100 parts by weight of the polymer(s) in the composition. When the total amount is less than 0.01 part by weight, the desired processing stability could not be sufficiently attained in some cases. When the total amount exceeds two parts by weight, the desired processing stability could not be improved more, hence disadvantageous from economical viewpoint.

The polymer composition of the present invention may further comprise additives. Examples of the additives include stabilizers such as phenol antioxidant, sulfur antioxidant, phosphorous antioxidant, ultraviolet absorber, photostabilizer and hydroxylamine; coloring modifiers such as 9,10-dihydro-oxa-10-phosphophenanthrene-10-oxide, etc.; and peroxide scavenger. The polymer composition may still further comprises additives for resin such as lubricant, plasticizer, flame retardant, nucleating agent, metal inactivating agent, antistatic agent, pigment, filler, pigment, antiblocking agent, surfactant, processing aid, foaming agent, emulsifier, brightener, and neutralizing agent such as calcium stearate and hydrotalcite.

Examples of the phenol antioxidant include the followings.

(1) Examples of alkylated monophenol
2,6-di-t-butyl-4-methylphenol, 2,4,6-tri-t-butylphenol, 2,6-di-t-butyl-4-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6'-(1'-methylheptadecyl-1'-yl)phenol, 2,4-dimethyl-6-(1'-methyltridecyl-1'-yl)phenol and a mixture thereof.

(2) Examples of alkylthiomethylphenol
2,4-dioctylthiomethyl-6-t-butylphenol, 2,4-dioctylthiomethyl-6-methylphenol, 2,4-dioctylthiomethyl-6- ethylphenol, 2,6-didodecylthiomethyl-4-nonylphenol and a mixture thereof (3) Examples of hydroquinone and alkylated hydroquinone 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl)adipate and a miture thereof (4) Examples of locopherol α-tocopherol, β-tocopherol, γ-tocopherol, δ-tocopherol and a mixture thereof (5) Examples of hydroxylated thiodiphenyl ether 2,2'-thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl)disulfide and the like (6) Examples of alkylidenebisphenol and derivative thereof 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol)], 2,2'-methylenebis(4-methyl-6-cyclohexylphenol), 2,2'-methylenebis(4-methyl-6-nonylphenol), 2,2'-methylenebis(4,6-di-t-butylphenol)], 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol), 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis[3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmer captobutane, bis[3,3-bis-3'-t-butyl-4'-hydroxyphenyl)butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmer captobutane, 1,1,5,5-tetra(5-t-butyl-4-hydroxy-2-methylphenyl)pentane, and a mixture thereof.

(7) Examples of O-, N- and S-benzyl derivative 3,5,3',5'-tetra-t-butyl-4,4'-dihydroxydibenzyl ether, octadodecyl-4-hydroxy-3,5-dimethylbenzylmercapto acetate, tris(3,5-di-t-butyl-4-hydroxybenzyl)amine, bis(4-t-butyl-3-hydroxy-2,6-dimethylbenzyl)dithioterephtha late, bis(3,5-di-t-butyl-4-hydroxybenzyl)sulfide, isooctyl-3,5-di-t-butyl-4-hydroxybenzylmercapto acetate and a mixture thereof (8) Examples of hydroxybenzylated malonate derivative dioctadecyl-2,2-bis(3,5-di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl) malonate, bis[4-(1,1,3,3-tetramethylbutyl)phenyl]-2,2-bis(3,5-di-t-butyl-4-hydroxybenzyl) malonate and a mixture thereof (9) Examples of aromatic hydroxybenzyl derivative 1,3,5-trimethyl-2,4,6-tris(3,5-di-t-butyl-4-hydroxybenzyl) benzene, 1,4-bis(3,5-di-t-butyl-4-hydroxybenzyl)-2,3,5,6-tetramethylbenzene, 2,4,6-tris(3,5-t-butyl-4-hydroxybenzyl)phenol and a mixture thereof

(10) Examples of triazine derivative 2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl-4-hydroxy)-1,3,5-triazine, tris(4-t-butyl-3-hydroxy-2,6-dimethylbenzyl isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl]isocyanurate and a mixture thereof

(11) Examples of benzyl phosphonate derivative dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calciumsaltof 3,5-di-t-butyl-4-hydroxybenzyl phosphonicacid monoester and a mixture thereof

(12) Examples of acylaminophenol derivative anilide 4-hydroxylaurate, anilide 4-hydroxystearate, octyl-N-(3,5-di-t-butyl-4-hydroxy phenyl)carbanate and a mixture thereof

(13) Esters of β-(3,5-di-t-butyl-4-hydroxyphenyl) propionic acid and the following monohydric or polyhydric alcohol:

methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof

(14) Esters of β-(5-t-butyl-4-hydroxy-3-methylphenyl) propionic acid and the following monohydric or polyhydric alcohol:

methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof

(15) Esters of β-(3,5-dicyclohexyl-4-hydroxyphenyl) propionic acid and the following monohydric or polyhydric alcohol:

methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-i-phospha-2,6,7-trioxabicyclo[2,2,2]octane and a mixture thereof

(16) Esters of 3,5-di-t-butyl-4-hydroxyphenylacetic acid and the following monohydric or polyhydric alcohol:

methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)

oxamide, 3-thiaundecanol, 3-thiapentadecanol, trimethylhexanediol, trimethylolpropane, 4-hydroxymethyl-1-phospha-2,6,7-trioxabicyclo[2,2,2]octane and a mixture thereof

(17) Examples of amide of β-(3,5-di-t-butyl-4-hydroxyphenyl)propionic acid

N,N'-bis[3-(3', 5'-di-t-butyl-4'-hydroxyphenyl)propionyl] hydrazine, N,N'-bis[3-(3', 5'-di-t-butyl-4'-hydroxyphenyl) propionyl]hexamethylenediamine, N,N'-bis[3-(3', 5'-di-t-butyl-4'-hydroxyphenyl)propionyl]trimethylenediamine and a mixture thereof Examples of the sulfur antioxidant include the followings:

dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetraylkis(3-lauryl thiopropionate) and the like.

Examples of the phosphorous antioxidant include the followings:

triphenyl phosphite, tris(nonylphenyl)phosphite, tris(2,4-di-t-butylphenyl)phosphite, trilauryl phosphite, trioctadecyl phosphite, distearyl pentaerythritol diphosphite, diisodecyl pentaerythritol diphosphite, bis(2,4-di-t-butylphenyl) pentaerythritol diphosphite, bis(2,4-di-t-butyl-6-methylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, bis (2,4,6-tri-t-butylphenyl)pentaerythritol diphosphate, tristearyl sorbitol triphosphite, tetrakis(2,4-di-t-butylphenyl)-4,4'-diphenylene diphosphite, 2,2'-methylenebis(4,6-di-t-butylphenyl)2-ethylhexyl phosphite, 2,2'-ethylidenebis(4,6-di-t-butylphenyl)fluoro phosphite, bis (2,4-di-t-butyl-6-methylphenyl)ethylphosphite, bis(2,4-di-t-butyl-6-methylphenyl)methyl phosphite, (2,4,6-tri-t-butylphenyl)-5-ethyl-5-butyl-1,3,2-oxaphosphorinane, 2,2', 2"-nitrilo[triethyl-tris(3,3', 5,5'-tetra-t-butyl-1,1'-biphenyl-2, 2'-diyl) phosphite and a mixture thereof Examples of the ultraviolet absorber include the followings:

(1) Examples of salicylate derivative phenyl salicylate, 4-t-butylphenyl salicylate, 2,4-di-t-butylphenyl 3',5'-di-t-butyl-4'-hydroxybenzoate, 4-t-octylphenyl salicylate, bis(4-t-butylbenzoyl)resorcinol, benzoylresorcinol, hexadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4'-hydroxybenzoate and a mixture thereof (2) Examples of 2-hydroxybenzophenone derivative 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and a mixture thereof (3) Examples of 2-(2'-hydroxyphenyl)benzotriazole 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxypheny)benzotriazole, 2-(3',5'-di-t-amyl-2'-hydroxyphenyl)benzotriazole, 2-[2'-hydroxy-3',5'-bis(α,α-dimethylbenzyl) phenyl]-2H-benzotriazole, 2-[(3'-t-butyl-2'-hydroxyphenyl)-5'-(2-octyloxycarbonylethyl) phenyl]-5-chlorobenzotriazole, 2-[3'-t-butyl-5'-[2-(2-ethylhexyloxy) carbonylethyl]-2'-hydroxyphenyl]-5-chlorobenzotriazole, 2-[3'-t-butyl-2'-hydroxy-5'-(2-methoxycarbonylethyl) phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3',5'-di-t-butyl-2-hydroxyphenyl)-5-chlorobenzotriazole, mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole, 2,2'-methylenebis[6-(2H-benzotriazol-2-yl)-4-(1,1,3,3-tetramethylbutyl)phenol, 2,2'-methylenebis[4-t-butyl-6-(2H-benzotriazol-2-yl)phenol], condensate of poly(3-11)(ethylene glycol) and 2-[3'-t-butyl-2'-hydroxy-5'-(2-methoxycarbonylethyl)phenyl] benzotriazole, condensate of poly(3-11) (ethylene glycol) and methyl 3-[3-(2H-benzotriazol-2-yl)-5-t-butyl-4-hydroxyphenyl]propionate, 2-ethylhexyl 3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxyphenyl] propionic acid and a mixture thereof.

Examples of the photostabilizer include the followings.

(1) Examples of hindered amine photostabilizer bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebaca te, bis(1,2,2,6,6-pentamethyl-4-piperidyl) 2-(3,5-di-t-butyl-4-hydroxybenzyl)-2-butylmalonate, bis(1-acrolyl-2,2,6,6-tetramethyl-4-piperidyl) 2,2-bis(3,5-di-t-butyl-4-hydroxybenzyl)-2-butylmalonate, bis(1,2,2,6,6-penatmethyl-4-piperidyldecanedioate, 2,2,6,6-tetramethyl-4-piperidyl methacrylate, 4-[3-(3,5-di-t-butyl-4-hydroxyphenyl)propionyloxy]-1-[2-(3-(3, 5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetarkis(2,2,6,6-tetramethyl-4-piperidyl) 1,2, 3,4-butaneteracarboxylate, tetrakis(1,2,2,6,6-pentamethyl-4-piperidyl) 1,2,3,4-butanetetracarboxylate, mixed esterified product of 1,2,3,4-butanetetracarboxylic acid and 1,2,2,6,6-pentamethyl-4-piperidinol and 1-tridecanol, mixed esterified product of 1,2,3,4-butanetetracarboxylic acid and 2,2,6,6-tetramethyl-4-piperidinol and 1-tridecanol, mixed esterified product of 1,2,3,4-butanetetracarboxylic acid and 1,2,2,6,6-pentamethyl-4-piperidinol and 3,9-bis(2-hydroxy-1,1-dimethylethyl)-2,4,8,10-tetraoxaspiro [5.5]undecane, mixed esterified product of 1,2,3,4-butanetetracarboxylic acid and 2,2,6,6-tetarmethyl-4-piperidinol and 3,9-bis(2-hydroxy-1, 1-dimethylethyl)-2,4,8,10-tetraoxaspiro [5.5]undecane, polycondensate of dimethyl succinate and 1-(2-hydroxyethyl)-4-hydroxy-2,2,6,6-tetramethylpiperidine, poly[(6-morpholino-1,3,5-triazin-2,4-diyl)((2,2,6,6-tetramethyl-4-piperidyl) imino)hexamethylene ((2,2,6,6-tetramethyl-4-piperidyl)imino)], poly[(6-(1,1,3,3-tetramethylbutyl)imino-1,3,5-triazin-2,4-diyl ((2,2,6,6-tetramethyl-4-piperidyl)imino)hexamethylene ((2,2,6,6-tetramethyl-4-piperidyl)imino)], polycondensate of N,N'-bis (2,2,6,6-tetramethyl-4-piperidyl)hexamethylenediamine and 1,2-bromoethane, N,N',4,7-tetrakis[4,6-bis(N-butyl-N-(2,2, 6,6-tetramethyl-4-piperidyl) amino)-1,3,5-triazin-2-yl]-4,7-diazadecane-1,10 diamine, N,N',4-tris[4,6-bis(N-butyl-N-(2,2,6,6-tetramethyl-4-piperidyl) amino)-1,3,5-triazin-2-yl]-

4,7-diazadecane-1,10 diamine, N,N',4,7-tetrakis[4,6-bis(N-butyl-N-(1,2,2,6,6-pentamethyl-4-piperidyl) amino)-1,3,5-triazin-2-yl]-4,7-diazadecane-1,10 diamine, N,N',4-tris[4,6-bis(N-butyl-N-(1,2,2,6,6-pentamethyl-4-piperidyl) amino)-1,3,5-triazin-2-yl]-4,7-diazadecane-1,10 diamine and a mixture thereof (2) Examples of acrylate photostabilizer ethyl α-cyano-β,β-diphenylacrylate, isooctyl α-cyano-β,β-diphenylacrylate, methyl α-carbomethoxycinnamate, methyl α-cyano-β-methyl-methoxycinnamate, butyl α-cyano-β-methyl-p-methoxycinnamate, methyl α-carbomethoxy-p-methoxycinnamate and N-(β-carbomethoxy-β-cyano-vinyl)-2-methylindoline and a mixture thereof (3) Examples of nickel photostabilizer nickel complex of 2,2'-thiobis-[4-(1,1,3,3-tetramethylbutyl)phenol], nickel dibutyldithiocarbamate, nickel salt of monoalkyl ester, nickel complex of ketoxime and a mixture thereof (4) Examples of oxamide photostabilizer 4,4'-dioctyloxyoxanilide, 2,2'-diethoxyoxanilide, 2,2'-dioctyloxy-5,5'-di-t-butylanilide, 2,2'-didodecyloxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and a mixture thereof (5) Examples of 2-(2-hydroxyphenyl)-1,3,5-triazine photostabilizer 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(4-methylphenyl)-1,3,5-triazine, 2-[2-hydroxy-4-(2-hydroxy-3-butyloxypropoxy)phenyl]-4,6-bis(2,4-dimethylphenyl)-1,3,5-triazine, 2-[2-hydroxy-4-(2-hydroxy-3-octyloxyphenyl)-4,6-bis(2,4-dimethylphenyl)-1,3,5-triazine and a mixture thereof.

Examples of the hydroxyamine include

N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N,N-dibenzylhydroxyamine, N,N-dibenzylhydroxyamine, N-hexadecyl-N-octadecylhydroxyamine, N-heptadecyl-N-octadecylhydroxyamine and a mixture thereof.

Examples of the lubricant include aliphatic hydrocarbon such as paraffin, wax, etc., higher aliphatic acid having 8 to 22 carbon atoms, higher aliphatic acid (having 8 to 22 carbon atoms) metal (Al, Ca, Mg, Zn) salt, aliphatic alcohol having 8 to 22 carbon atoms, polyglycol, ester of higher fatty acid having 4 to 22 carbon atoms and aliphatic monohydric alcohol having 4 to 18 carbon atoms, higher aliphatic amide having 8 to 22 carbon atoms, silicone oil, rosin derivative and the like.

Among these additives above, phenol antioxidant, phosphorous antioxidant, sulfur antioxidant, ultraviolet absorber, hindered amine photostabilizer are preferably used.

Examples of the particularly preferred phenol antioxidant include the following compounds, and they may be used in combination of the two or more:

2,6-di-t-butyl-4-methylphenol, 2,4,6-tri-t-butylphenol, 2,4-dioctylthiomethyl-6-methylphenol, 2,2'-thiobis(6-t-butylphenol), 4,4'-thiobis(3-methyl-6-t-butylphenol), 2,2-methylenebis(4-methyl-6-t-butylphenol), 2,2'-methylenebis[4-ethyl-6-t-butylphenol], 2,2'-methylenebis(4-ethyl-6-(α-methylcyclohexyl)phenol), 2,2'-methylenebis(4-methyl-6-cyclohexyl)phenol), 2,2'-methylenebis(4,6-di-t-butylphenol), 2,2'-ethylidenebis(4,6-di-t-butylphenol), 4,4'-methylenebis(6-t-butyl-2-methylphenol),4,4'-methylenebis(2,6-di-t-butylphenol), 4,4'-mbutylidenebis(3-methyl-6-t-butylphenol), 1,1'-bis(4-hydroxyphenyl)cyclohexane, 1,1-bis(5-t-butyl-4-hydroxy-2-methylphenyl)butane, 1,1,3-tris(5-t-butyl-4-hydroxy-2-methylphenyl)butane, ethylene glycol, bis[3,3-bis-3'-t-butyl-4'-hydroxyphenyl]butyrate], 2,4,6-tris(3,5-di-t-butyl-4-phneoxy)-1,3,5-triazine, tris(4-t-butyl-3-hydroxy-2,6-dimethylbenzyl)isocyanurate, tris(3,5-di-t-butyl-4-hydroxybenzyl)isocyanurate, tris[2-(3',5'-di-t-butyl-4'-hydroxycinnamoyloxy)ethyl)isocyanurate, diethyl-3,5-di-t-butyl-4-hydroxybenzyl phosphonate, di-n-octadecyl-3,5-di-t-butyl-4-hydroxybenzyl phosphonate, calcium salt of 3,5-di-t-butyl-4-hydroxybenzylphosphonic acid monoester, n-octadecyl 3-(3,5-di-t-butyl-4-hydroxyphenyl)propionate, neopentanetetrayltetrakis(3,5-di-t-butyl-4-hydroxydihydrocinnamate), thiodiethylenebis (3,5-di-t-butyl-4-hydroxycinnamate), 1,3,5-trimethyl-2,4,6-tris(3,5-di-t-butyl-4-hydroxybenzyl) benzene, 3,6-dioxaoctamethylenebis(3,5-di-t-butyl-4-hydroxycinnamate), hexamethylenebis(3,5-di-t-butyl-4-hydroxycinnamate), triethylene glycol bis(5-t-butyll-4-hydroxy-3-methylcinnamate),3,9-bis[2-(3-(3-t-butyl-4-hydroxy-5-methylphenyl) propionyloxy)-1,1-dimethylethyl]-2,4,8,10-tetraoxaspiro [5.5]undecane, N,N'-bis[3-(3',5'-di-t-butyl-4'-hydroxyphenyl)propionyl] hydrazine, N,N'-bis[3-(3',5'-di-t-butyl-4'-hydroxyphenyl) propionyl]hexamethylenediamine and the like.

Examples of the particularly preferred phosphorous antioxidant include the followings, and they may be used in combination of the two or more:

tris(nonylphenyl)phosphite, tris(2,4-di-t-butylphenyl) phosphite, distearyl pentaerythritol diphosphite, bis(2,4-di-t-butylphenyl)pentaerythritol diphosphite, bis(2,4-di-t-butyl-6-methylphenyl)pentaerythritol diphosphite, bis(2,6-di-t-butyl-4-methylphenyl)pentaerythritol diphosphite, tetrakis(2,4-di-t-butylphenyl)-4,4'-diphenylenediphosphite, 2,2'-methylenebis(4,6-di-t-butylphenyl) 2-ethylhexyl phosphite, 2,2'-ethylidenebis(4,6-di-t-butylphenyl) fluorophosphite, bis(2,4-di-t-butyl-6-methylphenyl) ethylphosphite, 2-(2,4,6-tri-t-butylphenyl)-5-ethyl-5-butyl-1,3,2-oxaphospholinane, 2,2',2"-nitrilo[triethyl-tris(3,3',5,5'-tetra-t-butyl-1,1'-biphenyl-2,2'-diyl) phosphite and the like Examples of the particularly preferred ultraviolet absorber include the followings, and two or more kinds of them can be used.

phenyl salicylate, 4-t-butylphenyl salicylate, 2,4-di-t-butylphenyl 3',5'-di-t-butyl-4'-hydroxybenzoate, 4-t-octylphenyl salycilate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl) methane, 2,2',4,4'-tetrahydroxybenzophenone, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'- hydroxyphenyl)benzotriazole, 2-[2'-hydroxy-3',5'-bis(α,α-dimethylbenzyl) phenyl]-2H-benzotriazole and the like Examples of the particularly preferred photostabilizer include the followings, and two or more kinds of them can be used.

bis(2,2,6,6-tetramethyl-4-piperidyl)sebacate, bis(1,2,2,6,6-pentamethyl-4-piperidyl)sebacate, bis(N-octoxy-2,2,6,6-pentamethyl-4-piperidyl)sebacate, bis(N-octoxy-2,2,6,6-pentamethyl-4-piperidyl)sebacate, bis(N-benzyloxy-2,2,6,6-tetarmethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butylmalonate, bis(1-acryloyl-2,2,6,6-tetramethyl-4-piperidyl) 2,2-bis(3,5-di-t-butyl-4-hydroxybenzyl)-2-butylmalonate, bis(2,2,6,6-tetramethyl-4-piperidyl)succinate, 2,2,6,6-tetramethyl-4-piperidyl methacrylate, 4-[3-(3,5-di-t-butyl-4-hydroxyphenyl) propionyloxy]-1-[2-(3-(3,5-di-t-butyl-4-hydroxyphenyl) propionyloxy)ethyl]-2,2,6,6-tetramethylpiperidine, 2-methyl-2-(2,2,6,6-tetramethyl-4-piperidyl)amino-N-(2,2,6,6-tetarmethyl-4-piperidyl) propionamide, tetrakis(2,2,6,6-tetramethyl-4-piperidyl) 1,2,3,4-butanetetracarboxylate, tetrakis(1,2,6,6-pentamethyl-4-piperidyl) 1,2,3,4-butanetetracarboxylate, mixed esterified product of 1,2,3,4-butanetetracarboxylic acid and 1,2,2,6,6-pentamethyl-4-piperidinol and 1-tridecanol, mixed esterified product of 1,2,3,4-butanetetracarboxylic acid and 2,2,6,6-tetramethyl-4-piperidinol and 1-tridecanol, mixed esterified product of 1,2,3,4-tetracarboxylic acid and 1,2,2,6,6-pentamethyl-4-piperidinol and 3,9-bis(2-hydroxy-1,1-dimethylethyl)-2,4,8,10-tetraoxaspiro [5.5]undecane, mixed esterified product of 1,2,3,4-butanetetracarboxylic acid and 2,2,6,6-tetarmethyl-4-piperidinol and 3,9-bis(2-hydroxy-1,1-dimethylethyl)-2,4,8,10-tetraoxaspiro [5.5]undecane, polycondensate of dimethyl succinate and 1-(2-hydroxyethyl)-4-hydroxy-2,2,6,6-tetramethylpiperidine, poly[(6-morpholino-1,3,5-triazin-2,4-diyl)((2,2,6,6-tetramethyl-4-piperidyl) imino) hexamethylene ((2,2,6,6-tetramethyl-4-piperidyl)imino)], poly[(6-(1,1,3,3-tetramethylbutyl)imino-1,3,5-triazin-2,4-diyl ((2,2,6,6-tetramethyl-4-piperidyl)imino)hexamethylene ((2,2,6,6-tetramethyl-4-piperidyl)imino)) and the like.

The polymer composition of the present invention can be produced, for example, by a method of incorporating Compounds (1) and (2) into polymers.

The above incorporation method should not be specifically restricted as long as it can homogeneously incorporate Compositions (1) and (2) into polymers. For example, Compounds (1) and (2) can be added to reaction mixtures during polymerization reaction or just after the termination of polymerization reaction. Compounds (1) and (2) can be added to polymers in a solution form after dissolved in a solvent, in a dispersion form after pulverized into a powder form to ease homogenous dispersion, or in a melted form after heated. In the case of using other additives, they may be dissolved in solvents prior to use.

Alternatively, compounds (1) and (2) can be added to a polymer which are being melted and kneaded, and the resulting mixtures can be further melted and kneaded. The melting and kneading of polymers is conducted, for example, by using mixing rolls, Banburymixers, rolls, kneaders, single-screwextruders, double-screw extruders, etc. After melted and kneaded, the resulting polymer compositions in a melted form can be directly subjected to a molding process without cooling or after sequentially cooling and re-heating.

The order of Compounds (1) and (2) to be added to polymers is not restricted specifically. Compound (2) can be added to polymers after the addition of Compound (1) or vice versa. Alternatively, Compounds (1) and (2) can be simultaneously added to polymers. In the case of using other additives, they can be added to polymers along with Compounds (1) and (2) at the same time or added before or after the addition of Compounds (1) and/or (2).

When the content of Compound (2) to be added to the polymer composition is low, particularly amount of the polymer composition to be prepared is small, it may become difficult to weigh the Compound (2) precisely. In such a case, it is preferred that a composition comprising Compounds (1) and (2) is previously prepared and then added to the polymer with weighing the composition. Since amount of the composition is much greater than the amount of Compound (2), hence weighing the amount of the composition precisely is much easier than weighing the amount of the Compound (2) precisely, this method satisfactorily facilitates a precise weighing of Compound (2).

The percentage of Compounds (1) and (2) in the composition comprising Compounds (1) and (2) is preferably set to substantially the same level as in the desired polymer composition.

The composition comprising Compounds (1) and (2) can be prepared, for example, by mixing Compounds (1) and (2) in a powder form using mixers such as an Hershel mixer (super mixer), ball mixer, pebble mill, tumble mixer, or change-can-mixer. When other additives are used, Compounds (1) and (2) can be mixed with the additives into the composition.

The composition comprising Compounds (1) and (2) can also be prepared, for example, by a method of adding Compound (2) to a solution dissolving Compound (1), and then crystallizing Compounds (1) and (2) into a solid composition. When other additives are used, they can be added to solvents together with Compound (2).

By using the above composition, Compounds (1) and (2) can be added to polymers at the same time.

Thus, the incorporation of Compounds (1) and (2) into a polymer can stabilize the polymer andmore improve its processing stability.

The polymer composition of the present invention substantially does not cause cross-linking even when heated, has satisfactory processing stability, and has the benefit of causing substantially no formation trouble due to the deterioration of flowability.

The following examples will describe the present invention in more detail but they should not be construed to restrict the scope of the present invention.

Examples 1 to 3 and Examples for References 1 to 3

2-t-Butyl-6-(3-t-butyl-2-hydroxy-5-methylbenzyl)-4-methylphenyl acrylate (Chemical compound 1) and 2,2'-methylenebis(6-t-butyl-4-methylphenol)diacrylate (Chemical compound 2) were mixed in the respective amounts as shown in Table 1 by using a triturator to obtain a stabilizing composition (100 parts by weight).

A half part by weight of the resulting stabilizing composition and 100 parts by weight of styrene-butadiene block copolymer (SBS) were melt-kneaded at 200° C. using a single-screw extruder, 30 mm in diameter, to obtain a polymer composition in a pellet form.

The composition thus obtained was heated to melt into a melted state at 260° C. by using a heating furnace in a melt-flow-ratemeter "MODELL203" (produced by Takara Kogyo Co.), and kept at the temperature for30 min. Thereafter immediately, measurement of melt-flow-rate (MFR)

under a loading condition of 2,160 g was conducted. The results are shown in Table 1.

TABLE 1

| | Chemical Compound 1 (part by weight) | Chemical Compound 2 (part by weight) | MFR (g/min) |
|---|---|---|---|
| Example 1 | 99.99 | 0.01 | 6.5 |
| Example 2 | 99.5 | 0.5 | 6.9 |
| Example 3 | 98 | 2 | 6.7 |
| Comparative example 1 | 0 | 0 | 4.4 |
| Comparative example 2 | 80 | 20 | 5.8 |
| Comparative example 3 | 100 | 0 | 6.3 |

The polymer compositions obtained in Examples 1 to 3 keep a high level of MFR even after being kept at 260° C. for 30 min. The results indicate that deteriorations of the flowability during their processing were small and that the polymer compositions exhibit good processing stability.

What is claimed is:

1. A polymer composition comprising
   a polymer;
   a bisphenol monoester represented by the Formula (1):

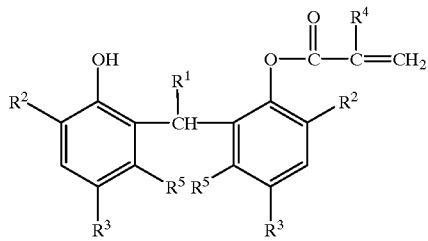

wherein $R^1$ represents hydrogen, alkyl having one to five carbon atoms or phenyl group; $R^2$ and $R^3$ each independently represents alkyl group having one to nine carbon atoms; and $R^4$ and $R^5$ each independently represents hydrogen or methyl group; and a bisphenol diester represented by Formula (2)

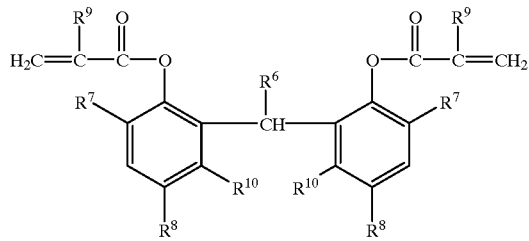

wherein $R^6$ represents hydrogen, alkyl having one to five carbon atoms or phenyl group; $R^7$ and $R^8$ each independently represents alkyl group having one to nine carbon atoms; and $R^9$ and $R^{10}$ each independently represents hydrogen or methyl group in which amount of the compound of formula (2) is 0.001 to 5 parts by weight based on 100 parts by weight of the total amount of the compounds of formulae (1) and (2).

2. The polymer composition according to claim 1, wherein the amount of the compound of formula (2) is 0.008 to 2.5 parts by weight based on 100 parts by weight of the total amount of the compounds of formulae (1) and (2).

3. The polymer composition according to claim 1, wherein the polymer has carbon-carbon double bonds (C=C) within the polymer chains.

4. The polymer composition according to claim 1, wherein the polymer is selected from styrene-butadiene block copolymers (SBS), butadiene rubbers (BR), styrene/butadiene rubbers (SBR), and high-impact polystyrenes (HI-PS).

5. The polymer composition according to claim 1, wherein the total amount of the compounds of formulae (1) and (2) in the polymer composition is about 0.01-2 parts by weight based on 100 parts by weight of the polymer in the composition.

6. A method for stabilizing a polymer which comprises incorporating a bisphenol monoester represented by the Formula (1):

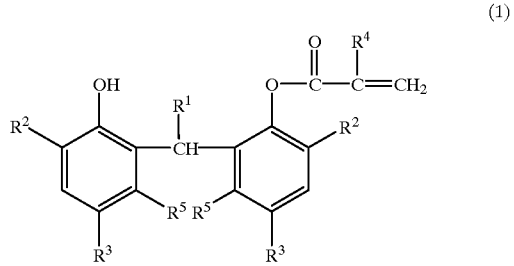

wherein $R^1$ represents hydrogen, alkyl having one to five carbon atoms or phenyl group; $R^2$ and $R^3$ each independently represents alkyl group having one to nine carbon atoms; and $R^4$ and $R^5$ each independently represents hydrogen or methyl group; and a bisphenol diester represented by Formula (2)

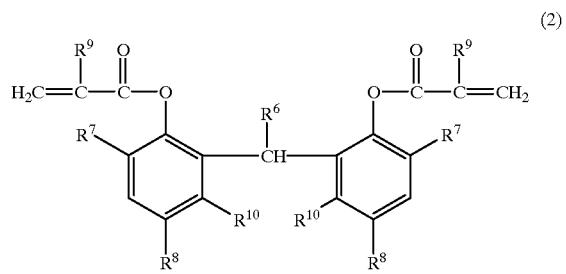

wherein $R^6$ represents hydrogen, alkyl having one to five carbon atoms or phenyl group; $R^7$ and $R^8$ each independently represents alkyl group having one to nine carbon atoms; and $R^9$ and $R^{10}$ each independently represents hydrogen or methyl group to the polymer.

7. The method according to claim 6, wherein the amount of the compound of formula (2) is 1 to 5 parts by weight based on 100 parts by weight of the total amount of the compounds of formulae (1) and (2).

8. The method according to claim 6, wherein the amount of the compound of formula (2) is 0.008 to 2.5 parts by weight based on 100 parts by weight of the total amount of the compounds of formulae (1) and (2).

9. A composition comprising a bisphenol monoester represented by the Formula (1):

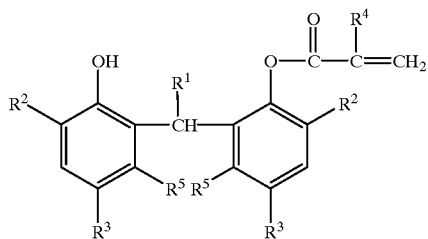 (1)

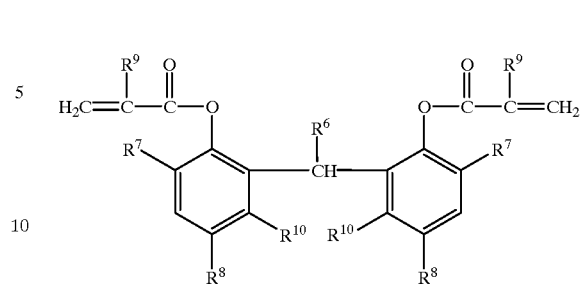 (2)

wherein $R^1$ represents hydrogen, alkyl having one to five carbon atoms or phenyl group; $R^2$ and $R^3$ each independently represents alkyl group having one to nine carbon atoms; and $R^4$ and $R^5$ each independently represents hydrogen or methyl group; and a bisphenol diester represented by Formula (2)

wherein $R^6$ represents hydrogen, alkyl having one to five carbon atoms or phenyl group; $R^7$ and $R^8$ each independently represents alkyl group having one to nine carbon atoms; and $R^9$ and $R^{10}$ each independently represents hydrogen or methyl group in which amount of the compound of formula (2) is 0.001 to 5 parts by weight based on 100 parts by weight of the total amount of the compounds of formulae (1) and (2).

* * * * *